Oct. 16, 1923. 1,471,189
H. A. MYERS
METHOD AND APPARATUS FOR FORMING SHEET GLASS
Filed Sept. 15, 1920 3 Sheets-Sheet 1
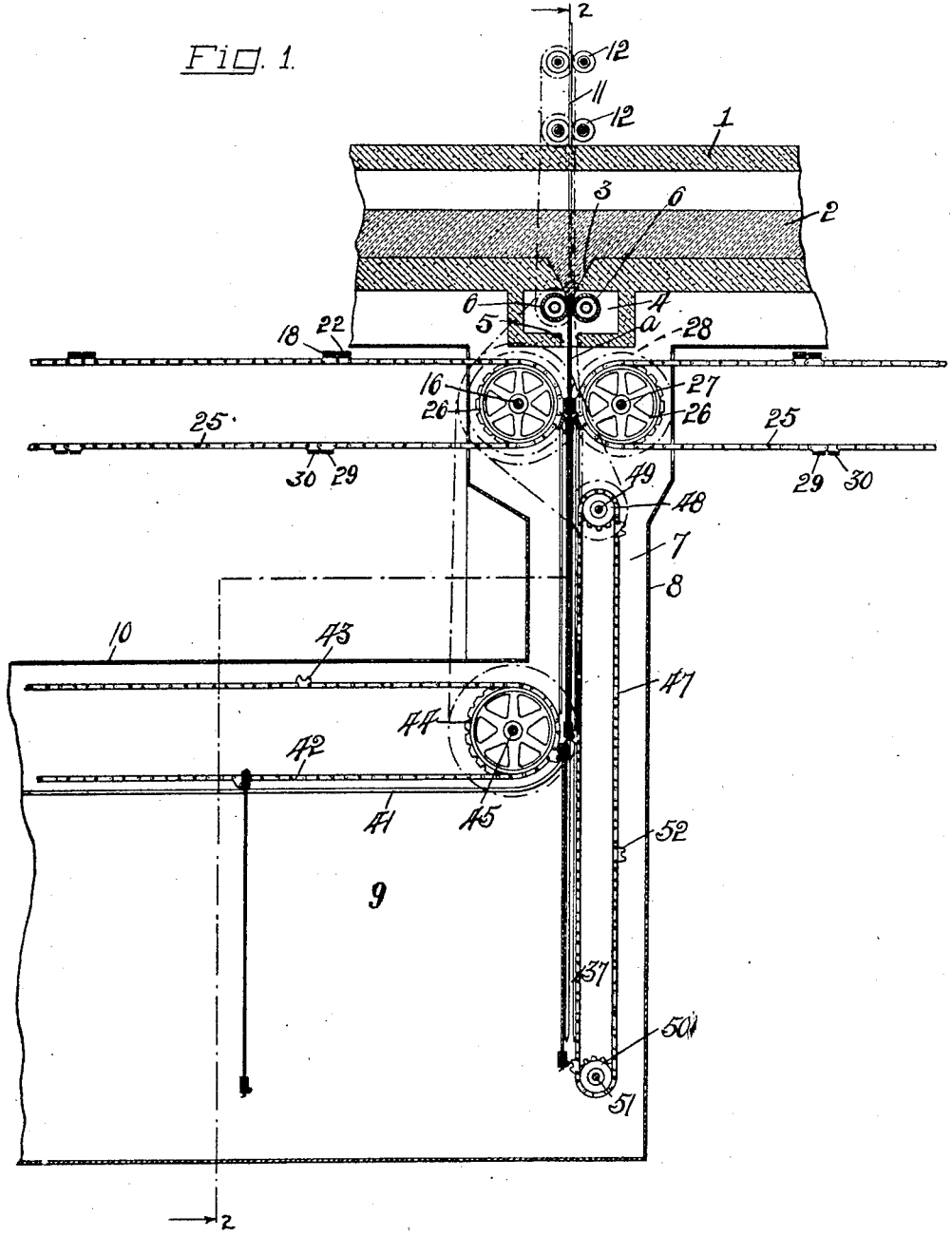
INVENTOR
Hubert A. Myers.
By Owen Owen & Crampton,
His attys.

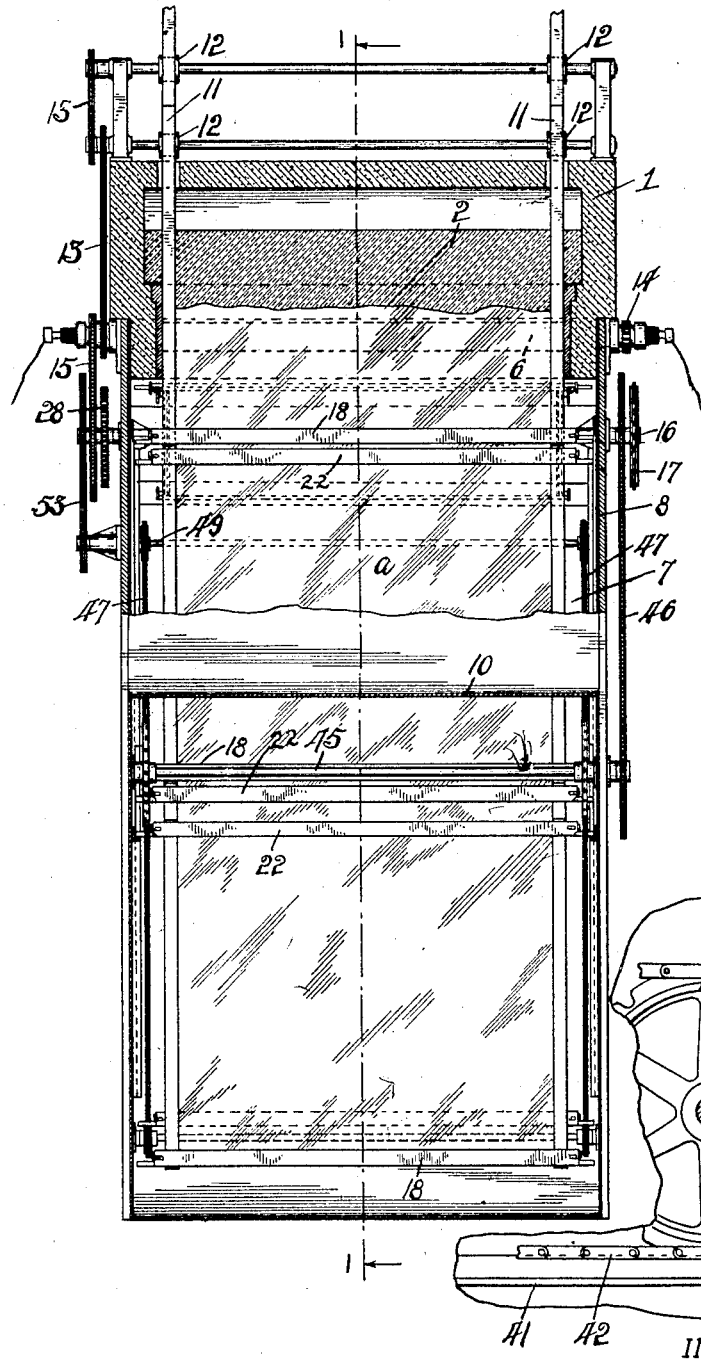
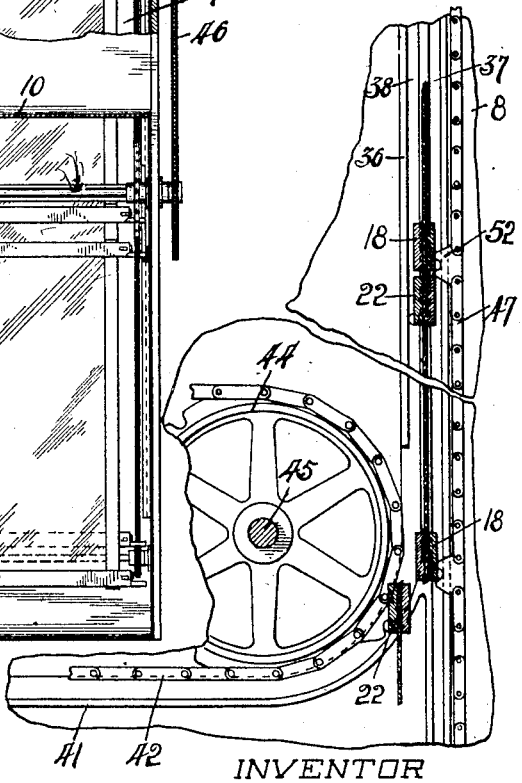

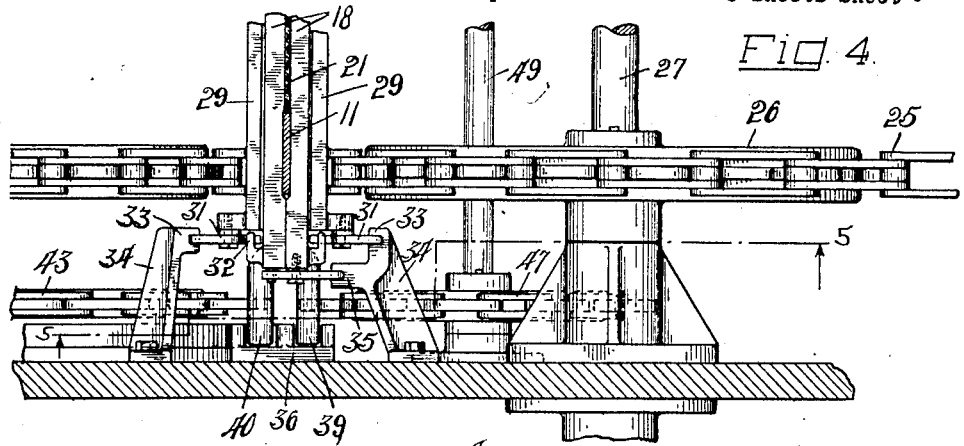
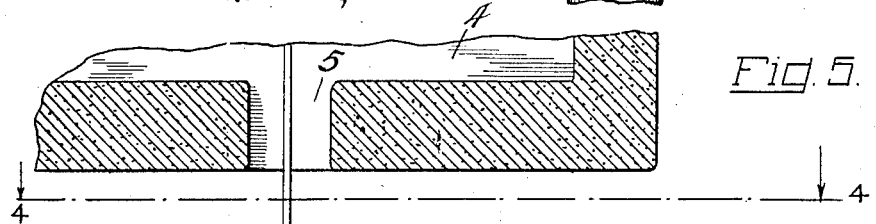
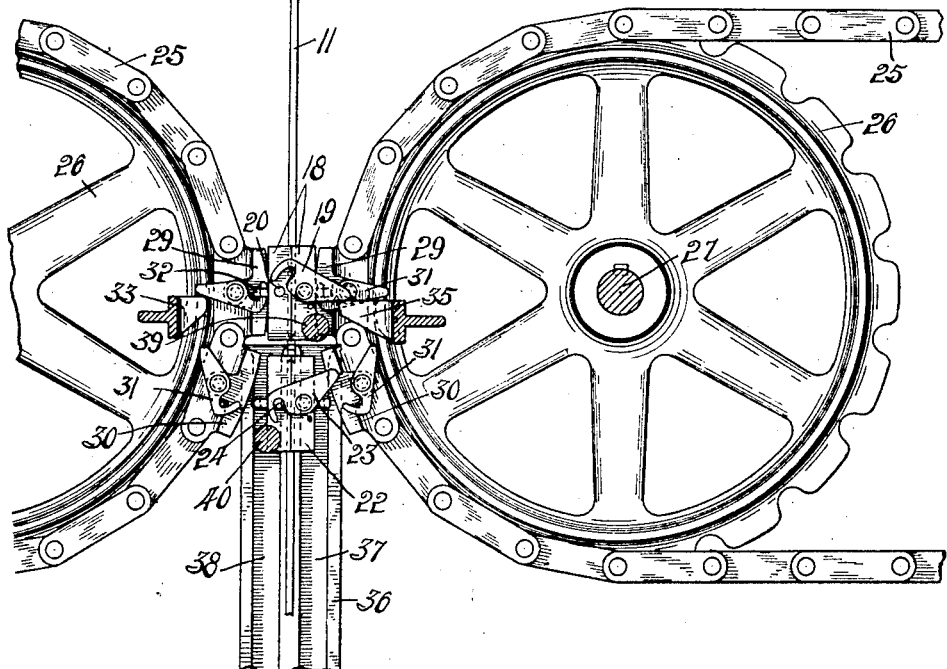

Patented Oct. 16, 1923.

1,471,189

UNITED STATES PATENT OFFICE.

HUBERT A. MYERS, OF TOLEDO, OHIO, ASSIGNOR TO THE HUBERT A. MYERS COMPANY, OF TOLEDO, OHIO, A CORPORATION OF OHIO.

METHOD AND APPARATUS FOR FORMING SHEET GLASS.

Application filed September 15, 1920. Serial No. 410,412.

*To all whom it may concern:*

Be it known that I, HUBERT A. MYERS, a citizen of the United States, and a resident of Toledo, in the county of Lucas and State of Ohio, have made an Invention Appertaining to Method and Apparatus for Forming Sheet Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the art of drawing or flowing glass in sheet or plate form from a tank or pot containing molten glass, and particularly to a species of the invention described and claimed in my former application for United States Letters Patent Serial No. 374,884, filed April 19, 1920.

The object of the present invention is to cover more or less specifically a method and apparatus for drawing or flowing a continuous sheet downward from a tank or other source of molten glass supply, applying frames in successive order thereto to prevent distortion of the portions of the sheet encompassed thereby, and subsequently separating the sheet between the frames into sections for annealing and separate handling.

The invention is fully described in the following specification, and while, in its broader aspect, it is capable of being practiced in numerous ways, one form of apparatus for practicing the same is illustrated in the accompanying drawings, in which, Figure 1 is a vertical longitudinal section of an apparatus embodying the invention with parts broken away, the section being taken on the line 1—1 in Fig. 2. Fig. 2 is a section on the line 2—2 in Fig. 1, with parts broken away. Fig. 3 is an enlarged fragmentary sectional detail of the means for severing the sheet into sections and changing the course of movement of the sections from a vertical to a horizontal. Fig. 4 is an enlarged fragmentary sectional detail taken on the line 4—4 in Fig. 5, and Fig. 5 is an enlarged section on the line 5—5 in Fig. 4.

Referring to the drawings, 1 designates a covered tank containing molten glass 2 and having a narrow slot-like opening 3 in its bottom through which glass may flow downwardly in continuous sheet form from the tank. The tank may be in connection with a melting furnace or have its supply of glass maintained in any other suitable manner.

The stream or sheet $a$ of glass after leaving the discharge opening 3 preferably passes downward through what may be termed a "tempering chamber" 4 formed on the under side of the tank bottom and having a narrow opening 5 in its bottom through which the sheet may pass without contact with the walls thereof. While a tempering heat may be maintained in any suitable manner in its bottom, I have illustrated for such purpose a pair of electrically heated rolls 6 properly positioned and spaced to have opposed gauging contact with the sheet to determine the thickness thereof. The sheet upon leaving the chamber 4 enters and passes downward a distance through a vertical chamber or compartment 7 formed by a casing 8 and then enters and passes in sectional form, as hereinafter described, through a horizontally disposed chamber 9 formed by a casing 10 which either itself forms or is in communication with a leer for annealing the ware.

During the drawing or flowing of the sheet from the tank, and continuous therewith, narrow strips 11, preferably of metal, are fed down through the tank at the edges of the sheet longitudinally thereof so that the strips adhere to and form the edge portions of the sheet as it flows from the tank, the strips being fed at the speed of flow or movement of the sheet. These strips preferably feed down through the respective end portions of the openings 3 with their inner edges only in contact with the sheet edges, and pass between the respective end portions of the rolls 6, which, in conjunction with one or more sets of rolls 12 above the tank, control the feeding of the strips. The different sets of rolls 6 and 12 may have chain and sprocket connection 13 to adapt them to be driven at uniform speed. The shafts of the rolls 6 are geared together at one end, as shown at 14, and one has driving chain and sprocket connection 15 at its other end with a drive shaft 16, which extends crosswise of the sheet $a$ at one side thereof and may have a sprocket-wheel 17 at one end without the casing 8 in connection with any suitable driving means.

The strips 11 are of like predetermined length with the ends of successive strips in abutment so that there will be an uninterrupted feeding of the same to the forming sheet edges, with the strips of the two sets arranged in pairs with their ends transversely aligned. When the lower ends of each pair of strips reach a predetermined point in their movement below the tank and while the strips are still engaged by the feeding roll 6, a pair of cross-bars 18 are fed from opposite sides of the sheet and pressed in opposed clamping relation thereagainst and to the side strips 11 and are secured together by pivoted end catches 19 on one bar engaging catch pins 20 on the other, as shown in Figs. 4 and 5. A space 21 is left between the opposed inner faces of the cross-bars 18 to accommodate the sheet of glass, which contacts with and is supported by the cross-bars. A similar pair of cross-bars 22 is likewise clamped to the upper ends of each pair of strips 11 and to the sheet as they pass a predetermined point in their descent and are retained in such clamping relation by the engagement of catches 23 on one bar with pins 24 on the other. It is thus evident that all edges of predetermined successive sections or areas of the sheet are held by frames of rectangular form which maintain the sheet sections of uniform size and prevent warping, sagging or other disfigurement thereof during the sheet forming and cooling action.

The cross-bars 18 and 22 are delivered in proper order and clamped to the respective sides of the strips 11 and sheet $a$ by two sets of chains 25 disposed at opposite sides of the sheet and passing around sprocket wheels 26 adjacent to the sheet within the upper portion of the chamber 7. One set of sprocket wheels 26 is mounted on a shaft 16 and the other set is mounted on a shaft 27 disposed at the opposite side of the sheet to the shaft 16 such shafts being connected without one end of the casing 18 by a set of gears 28 to cause them to rotate at uniform speed in opposite directions. Each set of chains 25 carries at properly spaced intervals cross-bars 29 and 30, each of which is pivotally connected in the chains and takes the place of a link in each chain of the set.

Each cross-bar 29 and 30 at each end thereof carries a pivoted catch or hook member 31 adapted to have hooked engagement with a finger 32 on the respective end of a bar 18 or 22 whereby the bar is held to the chain. The inner end of each hook member 31 is provided with a tail-piece for tripping engagement with a registering stationary cam 33 when a set of cross-bars has been placed in clamping engagement with the strips 11 and the interposed sheet. The cams or trip members 33 are carried by bracket arms 34 projecting inwardly from the respective sides of the casing 8.

The cross-bars 18 and 22, when being delivered to sheet clamping position, are carried, respectively, by the cross-bars 29 and 30 of each chain set, being disposed flatwise thereagainst with their sheet coacting sides outermost and being held to the chain crossbars by the engagement of the hook members 31 with the fingers or catch lugs 32 on the respective frame cross-bars 18 and 22. Approximately at the period of movement of a pair of frame bars into clamping engagement with the sheet and edge strips, the hook members 31 are moved to release the framebars from engagement with the chain-bars by reason of the tail-piece of the respective hook members striking and being moved by the obstructions 33. Approximately at the period of release of the frame-bars from the chain-bars the catch fingers 19 are moved into catch engagement with the pins 20 by reason of tail-pieces on the catch fingers 19 striking lugs or projections 35 on one side of the bracket-arms 34.

The frame-bar delivery chains 25 travel into and from the chamber 7 through openings in the side walls thereof and extend to any convenient point where frame-bars may be attached to the cross-bars thereof either mechanically or by hand.

A guide rail 36 is provided vertically within the chamber 7 at each edge of the sheet $a$ parallel with the movement thereof and has two vertical parallel guideways 37 and 38, which are spaced transversely of the sheet face so that the guide grooves are at opposite sides of the plane of movement of the sheet. The guide rails 36 extend down through the chamber 7 and into the chamber 8 to near the bottom thereof and is provided with two vertically extending guide grooves 37 and 38. Both grooves 37 and 38 are open at both top and bottom with the bottom opening of the groove 38 near the top of the chamber 9. One member of each pair of frame-bars 18 has a stud or trunnion 39 projecting from each end thereof in position, in the present instance, to enter the guide groove 37 at the top thereof when the bars have been placed in clamping engagement with the sheet $a$ and edge strips 11, while the opposite member of each set of frame bars 22 has a stud or trunnion 40 projecting from each end thereof for entering and passing down through the guide groove 38 when the bars 22 of a set have been placed in clamping relation to the sheet and edge strips, as shown in Figs. 4 and 5.

When a frame embraced section of the sheet $a$ is lowered a predetermined extent into the chamber 9, the trunnions 39 of the lower cross-bars 18 and the trunnions 40 of the upper cross-bars 22 of the frame will leave the lower ends of the respective guide grooves 37 and 38 and the frame and the embraced portion of the sheet will then be caused to move laterally from the vertical plane of movement of the sheet and in a horizontal direction through the chamber 9 with the trunnions 40 following flanges or rails 41 on which they rest at the respective sides of the chamber 9. The flanges 41 extend in curved lines from the inner walls of the vertical guide grooves 38 and then extend horizontally through the chamber 9. The transverse feeding movement of the frame sections is positively effected by chains 42 disposed in the chamber 9 at each side thereof above the flanges 41 and carrying notched lugs 43 at properly spaced intervals to engage the respective trunnions 40 as they leave the lower ends of the grooves 38 and to continue in engagement therewith so long as it may be desired to continue the feeding movement of the frame sections through the chamber 9. The chains 42 pass around sprocket-wheels 44 adjacent to the lower ends of the guide grooves 38, such sprocket-wheels being carried by a cross-shaft 45. This shaft is journaled in the sides of the casing 10 and is driven from the shaft 16 through a chain and sprocket wheel connection 46, the speed of driving of the shaft 45 being uniform with that of the shafts 16 and 27.

The severing of the sheet $a$ between the upper and lower sets of clamping bars of adjoining frames is caused to take place by a stretching action of the sheet by reason of a relative lateral movement of such sets of frame bars as one is caused to move horizontally along the rails 41 and the other is caused to continue its vertical movement along the guide rails 36, it being understood that the glass is still in a soft stretchable condition at this point by reason of the heat within the chambers 9 and 7. Upon a severing of each framed section of the sheet the section is carried in suspended relation through the annealing chamber. A positive feeding movement uniform with the feeding of the sheet from the tank is imparted to the lower end of each sheet embracing frame by a pair of chains 47 which pass at their upper ends around sprocket-wheels 48 on a shaft 49 disposed below a set of sprocket wheels 26, and at their lower ends around sprocket wheels 50 carried by a shaft 51 slightly below the lower ends of the guide grooves 37. The chains 47 carry notched lugs 52 at properly spaced intervals thereon to engage with the trunnions 39 of each lower set of clamping bars 22 when said bars have descended a predetermined distance, the feeding engagement of the lugs with the trunnions being continued until the trunnions have passed from the lower ends of the guide grooves 37. The shaft 49 is driven from the shaft 16 through a chain and sprocket wheel connection 53.

In the operation of the apparatus illustrated in carrying out my method the edge strips 11 are fed in continuous successive order down through the tank at the edges of the sheet $a$ flowing from the tank, the speed of movement of the strips being the same as the speed of flow of the forming sheet $a$ due to both the glass at the sheet forming point thereof and the strips passing between the feed rolls 6 which are heated to serve as a tempering means for the glass to impart the proper sheet forming consistency thereto. The edge strips 11 act as width maintaining means for the sheet and prevent the natural tendency of the soft glass to draw in at the edges of the sheet. When the sheet and strips have lowered a predetermined extent in the chamber 7, a set of cross-bars 18 is applied in opposed clamping relation to the sheet and edge strips at the lower ends of the latter by the chains 25—25, the cross-bars being released from the chains by the engagement of the carrying hooks 31 with the stationary members 33. Approximately coincident with the releasing of the hooks 31 from the frame bars the catch fingers 19 engage the standard coacting members 35 and are moved thereby into catch engagement with the pins 20 thereby locking the cross-bars in sheet clamping relation. When the sheet and strips have lowered sufficiently to place the upper end in a pair of edge strips in cross-bar receiving position, the chains 25—25 will apply a set of cross-bars 22 to the sheet and strips in the same manner that the cross-bars 18 were applied thereto, thereby completing the framing of a predetermined section or area of the sheet. These operations are repeated for each successive sheet section and pair of edge strips 11. As the sets of frame-bars 18 and 22 pass downward with the sheet after being applied thereto the trunnions 39 of the former enter and pass downward in the guide grooves 37 while the trunnions 40 of the latter enter and pass downward into guide grooves 38. When each section is lowered sufficiently for the trunnions at the lower and upper ends to pass from the lower ends of the respective guide grooves 37 and 38, the trunnions at the upper end of the frame will be engaged by the chain lugs 43 and caused thereby to follow the lateral deflecting course of the guide rolls or flanges 41, which causes a lateral separation of the adjacent ends of adjoining frames to effect a severing of the soft glass therebetween and then conveys the individual framed sections of glass separately and in suspended relation through the annealing chamber 9.

It is evident that I have provided a method and apparatus for forming sheet or plate glass in which a sheet of glass is caused to flow continuously at uniform speed from the supply tank; that frames are successively engaged with the sheet to embrace successive areas thereof of predetermined size as the sheet is formed; that the frames, or portions thereof, serve in a way as a drawing means for the sheet to augment if necessary the gravity flowing action of the glass and also prevent inward drawing or contractions of the edges thereof, and that the sheet is severed between the sections and then carried through an annealing chamber, each sheet section being retained in its frame until thoroughly set and preferably until discharged from the leer. After the removal of the frames from the sheet sections, which may be accomplished in any suitable manner, the edge portions of the sections may be removed therefrom leaving a sheet of perfect uniformity throughout and devoid of any waves or surface irregularities.

I wish it understood that the method described may be varied in numerous respects and practiced by numerous apparatus other than the one illustrated without departing from the spirit of the claims, the apparatus shown and described being merely for the purpose of illustration and not to restrict the scope of the invention.

Having thus described my invention, what I claim as new and desire to secure by Letters Patent is,—

1. The method of forming sheet glass, which consists in flowing sheet glass downward from a molten bath, feeding strips in successive longitudinally aligned order to the edges of the sheet lengthwise thereof and in adherence therewith, with the edge strips at opposite edges of the sheet forming pairs, and applying cross members at intervals to the sheet and strips to connect the latter in pairs.

2. The method of forming sheet glass, which consists in flowing glass in sheet form downward from a tank containing molten glass, applying members successively to the plastic sheet below the tank to separate the sheet into sections, and successively moving the sections laterally from the direction of flow to sever the sheet between the sections.

3. The method of forming sheet glass, which consists in flowing glass in sheet form from a molten bath, applying frames successively to the plastic sheet, and successively acting on the framed sections to impart relative lateral movements to adjacent ends thereof to sever the sheet therebetween.

4. The method of forming sheet glass, which consists in flowing glass in sheet form vertically from a molten source of supply, applying successive frame sections to the sheet during the vertical movement thereof and at a predetermined point in the vertical movement of each framed section laterally moving the same to separate it from the forming sheet and convey it to a delivery point.

5. The method of forming sheet glass, which consists in continuously forming glass in sheet form from a source of molten glass supply, the sheet being continuously moved vertically from the forming point, successively applying frames to the sheet to embrace and hold predetermined areas of the sheet, and at a predetermined point in the movement of each framed area, while the glass is still in a plastic sheet, imparting relative lateral movement to the adjacent ends of adjoining sections to sever the sheet therebetween.

6. In an apparatus for forming sheet glass, a tank containing molten glass from which glass may flow in sheet form, means for feeding edge strips in successive order to the respective edges of the sheet in adherence therewith, means for applying cross strips at intervals to the sheet and edge strips to cooperate with the latter to form frames, means for directing the movement of the frames a predetermined distance in the direction of movement of the sheet, and means for successively engaging and moving each frame laterally from the path of flow of the sheet when at a predetermined point in its movement whereby to sever the sheet between adjoining frames.

7. In an apparatus for forming sheet glass, a tank containing molten glass from which glass may flow in sheet form, means for feeding strips successively through the tank at the edges of the forming sheet in adherence therewith and at the speed of flow of the sheet, means for clamping cross bars at intervals to the sheet and edge strips to cooperate with the latter to form frames embracing predetermined sheet areas, means for imparting predetermined vertical movements to the frames, and means for engaging each frame at a predetermined point in its vertical movement and moving it laterally from the direction of flow of the sheet to a delivery point.

8. In an apparatus for forming sheet glass, a tank for containing molten glass from which glass may flow continuously in sheet form, means for successively feeding end strips in pairs to the opposite edges of the sheet being formed lengthwise of the movement thereof in adherence therewith, means for successively applying upper and lower sets of cross bars to the upper and lower ends of each pair of edge strips and to the sheet to cooperate with the edge strips to embrace a predetermined sheet area, means for guiding the vertical movements of the frame sheet section and adapted to release the upper and lower ends of each frame for horizontal movement when it has reached a predetermined point in its vertical movement, and means for engaging and moving each frame section laterally from the guide means when in side delivery position and to effect a severing of the sheet between the upper end of the laterally moving section and the lower end of a succeeding section.

9. In an apparatus for forming sheet glass, a tank having an opening in its bottom through which molten glass may flow in sheet form, a leer adjacent to the tank and having a vertical passageway in communication with the tank opening, mechanism for applying frames to successive areas of a forming sheet as it flows from the tank through said passageway, and means for separating the framed sections and conveying them through the leer when they have moved downward into register with the leer.

10. In an apparatus for forming sheet glass, a tank having an opening in its bottom from which molten glass may flow in sheet form, means forming a leer subjacent to the tank and a vertical passageway in communication with the tank opening, means for feeding successive edge strips in pairs to the side edges of a sheet as it flows from the tank, means for applying cross bars successively in pairs to the upper and lower ends of each pair of edge strips and the interposed sheet section to cooperate with the edge strips to form sheet embracing frames, means for guiding and moving the framed sheet sections down through the passageway and into the leer, and means for engaging edge sheet section embracing frame when in the leer to move it laterally from the succeeding framed section to sever the sheet therebetween and to carry the severed section through the leer.

In testimony whereof I have hereunto signed my name to this specification.

HUBERT A. MYERS.